US010320976B2

(12) United States Patent
Bostick et al.

(10) Patent No.: US 10,320,976 B2
(45) Date of Patent: Jun. 11, 2019

(54) CALL FLAGGING USING SHARED CALL LOGS

(71) Applicant: International Business Machines Corporation, Armonk, NY (US)

(72) Inventors: James E. Bostick, Austin, TX (US); John M. Ganci, Jr., Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 793 days.

(21) Appl. No.: 14/799,394

(22) Filed: Jul. 14, 2015

(65) Prior Publication Data
US 2017/0019533 A1    Jan. 19, 2017

(51) Int. Cl.
H04M 3/42 (2006.01)
H04M 3/436 (2006.01)
H04W 4/16 (2009.01)
H04L 12/58 (2006.01)
H04W 4/12 (2009.01)

(52) U.S. Cl.
CPC ........... *H04M 3/436* (2013.01); *H04L 51/12* (2013.01); *H04L 51/32* (2013.01); *H04W 4/12* (2013.01); *H04W 4/16* (2013.01); *H04M 2203/551* (2013.01); *H04M 2203/655* (2013.01)

(58) Field of Classification Search
None
See application file for complete search history.

(56) References Cited

U.S. PATENT DOCUMENTS 9,015,245 B1* 4/2015 Lee .................. H04L 29/06476
709/204
2010/0293247 A1* 11/2010 Mckee .................. G06Q 10/10
709/218

(Continued)

FOREIGN PATENT DOCUMENTS

JP    2010161589 A    7/2010
JP    2012134647 A    7/2012

OTHER PUBLICATIONS

IBM, Method and apparatus to detect fraud registration to Web based services, Apr. 13, 2009.

(Continued)

*Primary Examiner* — Jinsong Hu
*Assistant Examiner* — Alexander J Yi
(74) *Attorney, Agent, or Firm* — Garg Law Firm, PLLC; Christopher K. McLane

(57) ABSTRACT

A method, system, and computer program product for call flagging using shared call logs are provided in the illustrative embodiments. A determination is made that a phone call should be flagged as undesirable. In a call log in the device, a call entry corresponding to the phone call is selected. The call entry is modified to form a modified call entry, the modified call entry comprising an annotation, the annotation describing a reason for flagging the call as undesirable. A sharing rule is configured relative to the modified call entry. The modified call entry is sharing selectively according to the sharing rule with a subset of a set of social contacts of a user of the device on a social network.

19 Claims, 6 Drawing Sheets

(56) References Cited

U.S. PATENT DOCUMENTS

| | | | | |
|---|---|---|---|---|
| 2011/0282942 A1* | 11/2011 | Berger | ................... | G06Q 10/10 709/204 |
| 2011/0294478 A1* | 12/2011 | Trivi | .................... | H04M 3/436 455/415 |
| 2013/0060860 A1* | 3/2013 | Myslinski | .............. | G06Q 10/10 709/204 |
| 2016/0057199 A1* | 2/2016 | Aziz | ....................... | H04L 67/06 709/204 |

OTHER PUBLICATIONS

Anonymous, Phishing detection and prevention, Jun. 13, 2012.
Wikipedia, Data analysis techniques for fraud detection, http://en.wikipedia.org/wiki/Data_analysis_techniques_for_fraud_detection, Sep. 14, 2014.
Wikipedia, Phone Fraud, http://en.wikipedia.org/wiki/Phone_fraud, Nov. 2, 2014.
Wikipedia, TelemarketingFraud, http://en.wikipedia.org/wiki/Telemarketing_fraud, Aug. 19, 2014.
Appendix P, Jul. 14, 2015.

* cited by examiner

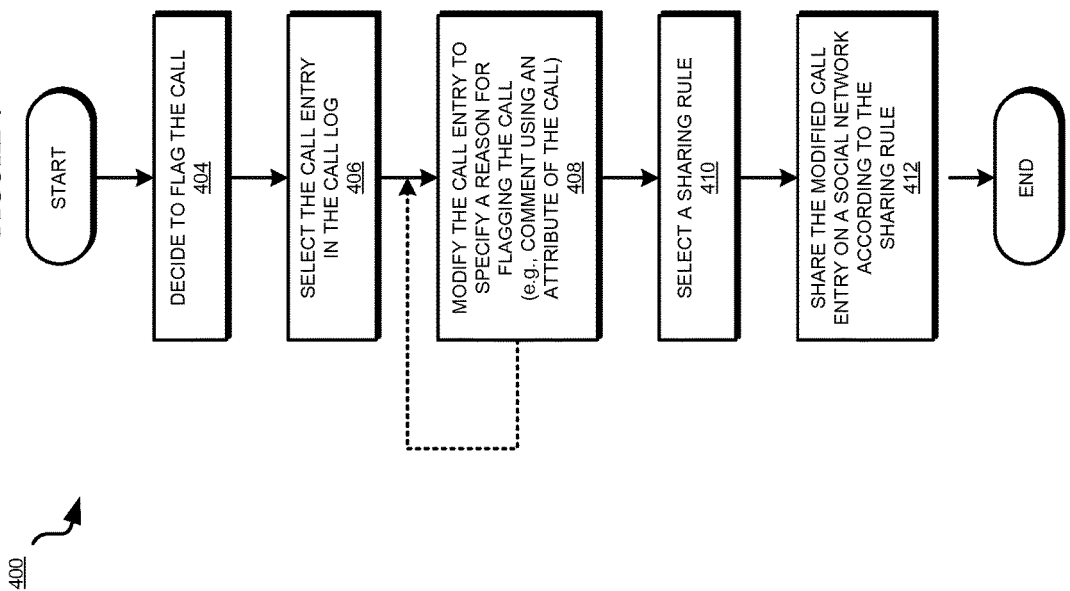

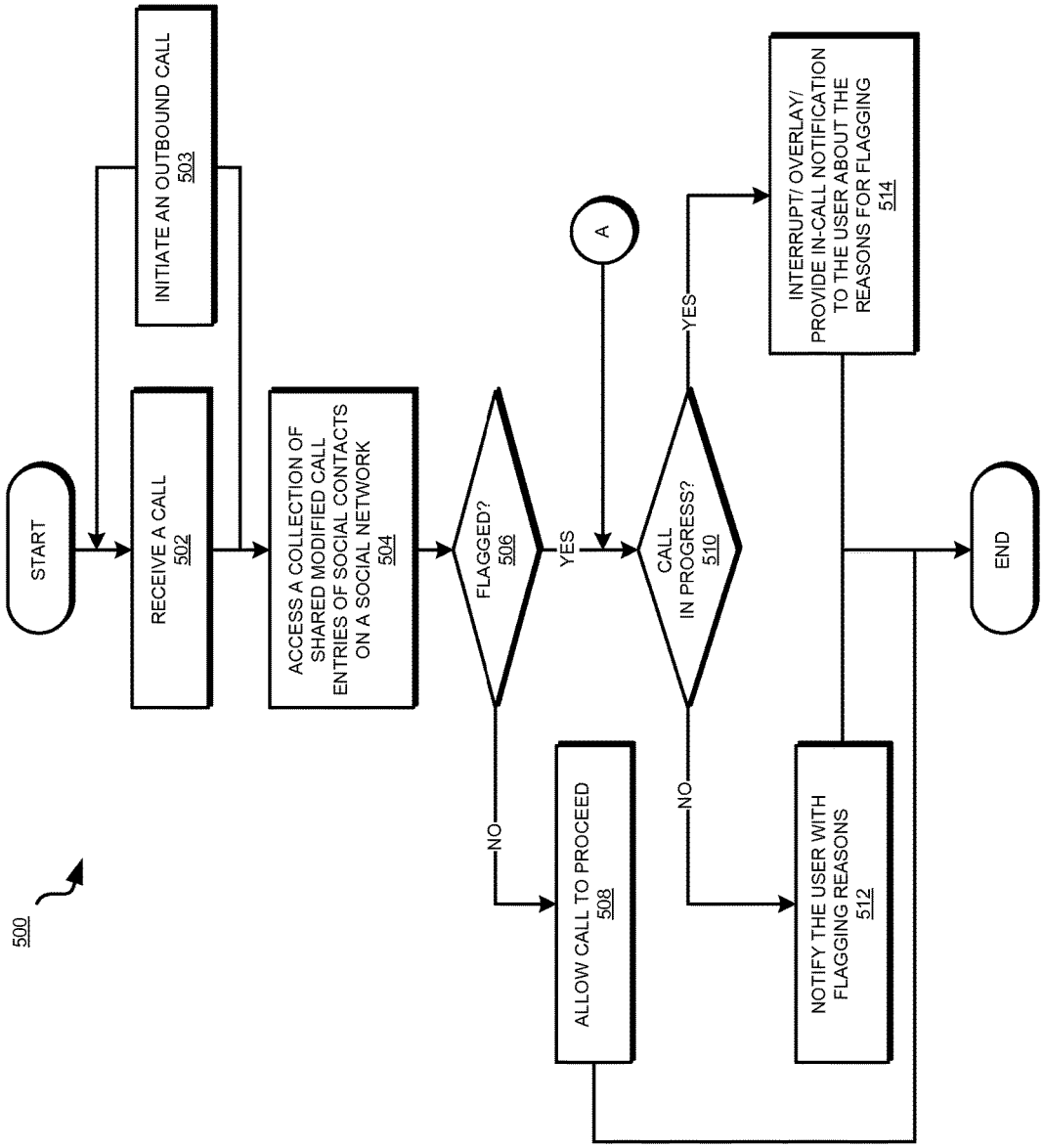

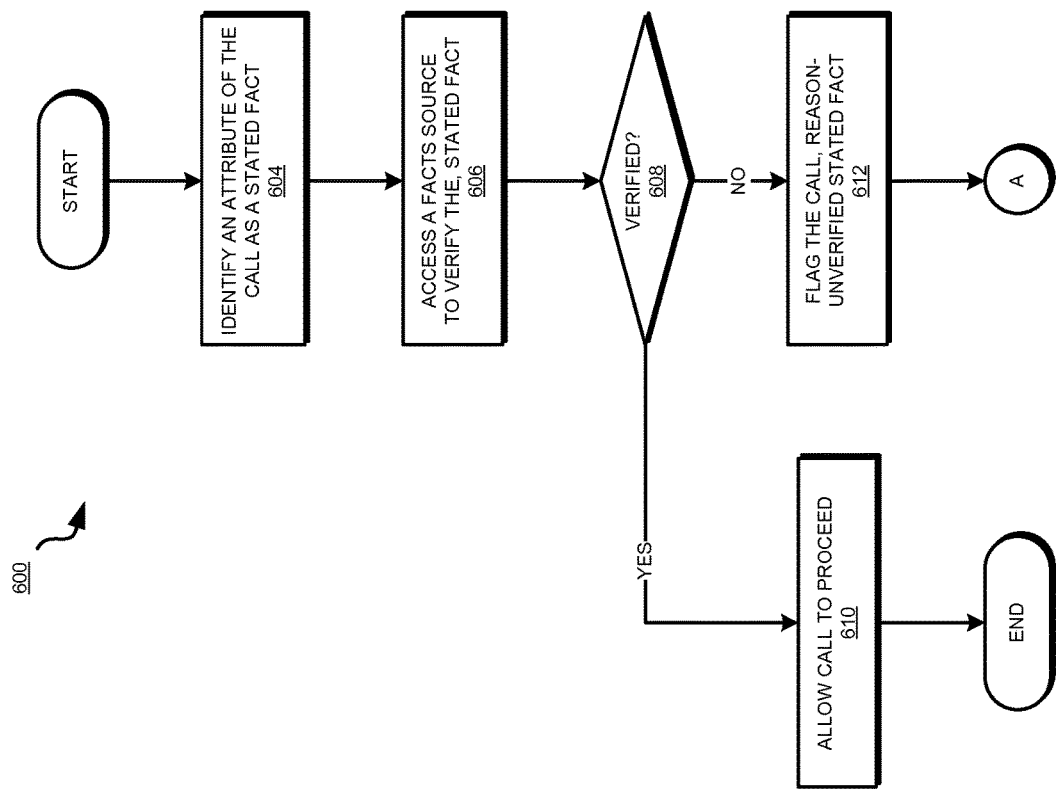

CALL FLAGGING USING SHARED CALL LOGS

TECHNICAL FIELD

The present invention relates generally to a method, system, and computer program product for reducing undesirable phone calls. More particularly, the present invention relates to a method, system, and computer program product for call flagging using shared call logs.

BACKGROUND

Undesirable phone calls (call, calls) are a common experience for many users. While some calls can be undesirable simply for being annoying, other calls can be undesirable due to their potential to cause harm to persons or property.

For example, a telemarketing phone call is annoying in most cases due to the insistent manner in which the caller seeks to sell something. A call to offer fraudulent sale of securities or real estate can cause serious damage to a person's finances. As another example, a fraudulent call to misinform a user about their credit and commit identity theft has the potential to cause harm to the user's person and property.

Many phone service providers and call-related applications attempt to block undesirable calls using one or more lists of phone numbers. The lists are often referred to as blacklists, and include phone numbers from which undesirable calls are known to originate.

When a user is using a blacklist and receives an undesirable call, a caller identifier (caller ID) identifies the phone number associated with the undesirable call. If the phone number exists in the blacklist, the blacklist prevents the call from ringing the phone, disconnects the undesirable call, sends the undesirable call to voicemail, plays a pre-recorded message to the caller, or some combination thereof.

SUMMARY

The illustrative embodiments provide a method, system, and computer program product for call flagging using shared call logs. An embodiment includes a method for call flagging using shared call log entries. The embodiment determines, using a processor in a device, that a phone call should be flagged as undesirable. The embodiment selects, in a call log in the device, a call entry corresponding to the phone call. The embodiment modifies the call entry to form a modified call entry, the modified call entry comprising an annotation, the annotation describing a reason for flagging the call as undesirable. The embodiment configures a sharing rule relative to the modified call entry. The embodiment shares selectively, according to the sharing rule, the modified call entry with a subset of a set of social contacts of a user of the device on a social network.

Another embodiment includes a computer program product for call flagging using shared call log entries. The embodiment further includes one or more computer-readable tangible storage devices. The embodiment further includes program instructions, stored on at least one of the one or more storage devices, to determine, using a processor in a device, that a phone call should be flagged as undesirable. The embodiment further includes program instructions, stored on at least one of the one or more storage devices, to select, in a call log in the device, a call entry corresponding to the phone call. The embodiment further includes program instructions, stored on at least one of the one or more storage devices, to modify the call entry to form a modified call entry, the modified call entry comprising an annotation, the annotation describing a reason for flagging the call as undesirable. The embodiment further includes program instructions, stored on at least one of the one or more storage devices, to configure a sharing rule relative to the modified call entry. The embodiment further includes program instructions, stored on at least one of the one or more storage devices, to share selectively, according to the sharing rule, the modified call entry with a subset of a set of social contacts of a user of the device on a social network.

Another embodiment includes a computer system for call flagging using shared call log entries. The embodiment further includes one or more processors, one or more computer-readable memories and one or more computer-readable storage devices. The embodiment further includes program instructions, stored on at least one of the one or more storage devices for execution by at least one of the one or more processors via at least one of the one or more memories, to determine, using a processor in a device, that a phone call should be flagged as undesirable. The embodiment further includes program instructions, stored on at least one of the one or more storage devices for execution by at least one of the one or more processors via at least one of the one or more memories, to select, in a call log in the device, a call entry corresponding to the phone call. The embodiment further includes program instructions, stored on at least one of the one or more storage devices for execution by at least one of the one or more processors via at least one of the one or more memories, to modify the call entry to form a modified call entry, the modified call entry comprising an annotation, the annotation describing a reason for flagging the call as undesirable. The embodiment further includes program instructions, stored on at least one of the one or more storage devices for execution by at least one of the one or more processors via at least one of the one or more memories, to configure a sharing rule relative to the modified call entry. The embodiment further includes program instructions, stored on at least one of the one or more storage devices for execution by at least one of the one or more processors via at least one of the one or more memories, to share selectively, according to the sharing rule, the modified call entry with a subset of a set of social contacts of a user of the device on a social network.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts a flowchart of an example process for creating a sharable modified call entry in a call log in accordance with an illustrative embodiment;

FIG. 5 depicts a flowchart of an example process for call flagging using shared call logs in accordance with an illustrative embodiment; and FIG. 6 depicts a flowchart of an example process for verifying a stated fact of a call in accordance with an illustrative embodiment.

DETAILED DESCRIPTION

Figure 1:
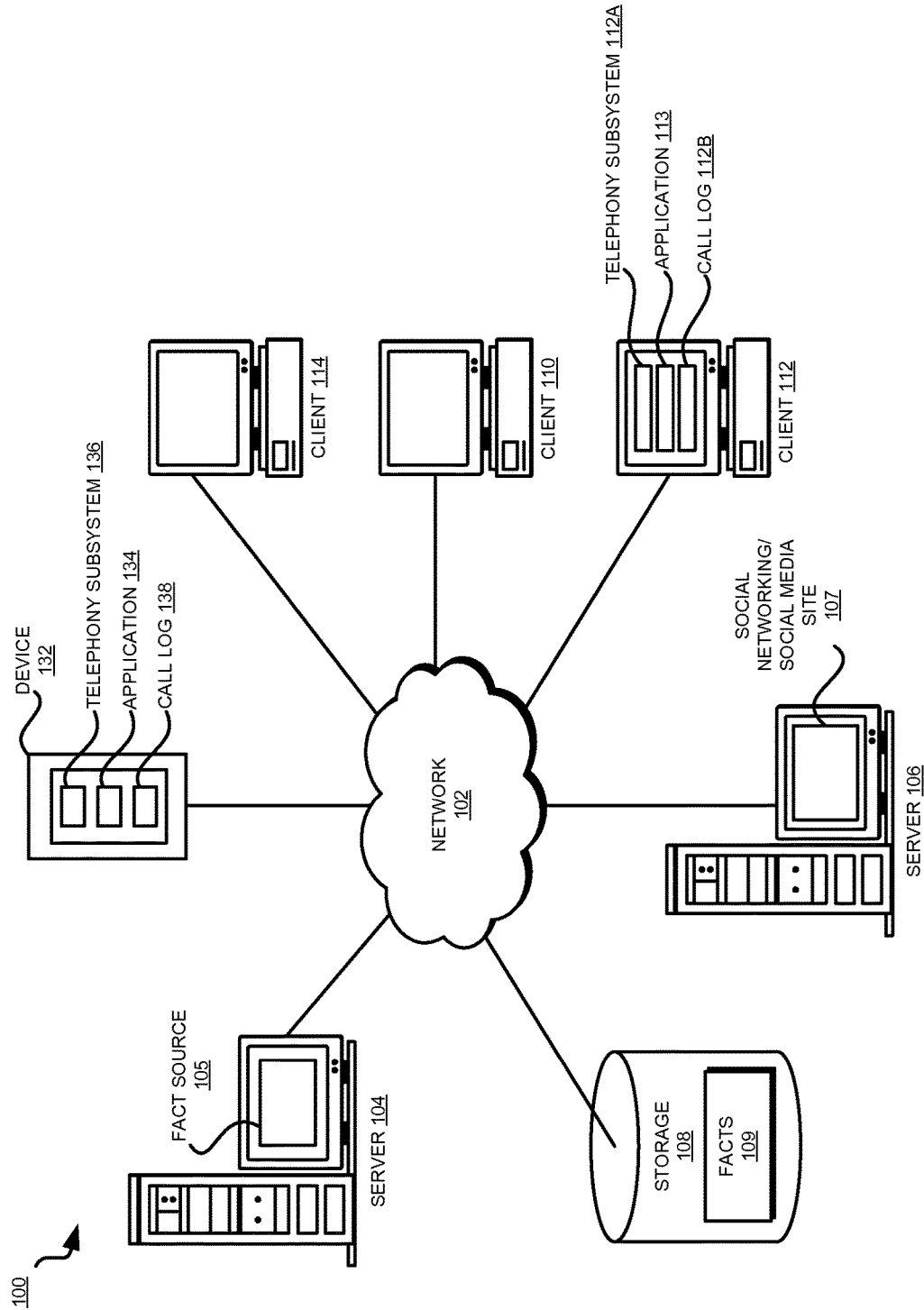
FIG. 1 depicts a block diagram of a network of data processing systems in which illustrative embodiments may be implemented.

Within the scope of the illustrative embodiments, a device used for making or receiving a call comprises a telephony subsystem that is capable of initiating call, receiving call, or both. A call, whether inbound to the device or outbound from the device, is logged in a call log.

Logging a call comprises recording data about the call in the call log. The call data presently logged for inbound calls comprises the caller's phone number, an identity of the caller if available locally at the device or remotely from the caller or the service provider, and duration of the call. In some cases, a status indicator in the call log indicates whether the call succeeded, failed, or was diverted. Similarly, the call data presently logged for outbound calls comprises the called party's phone number, an identity of the called party if available locally at the device or remotely from the service provider, and duration of the call. In some cases, a status indicator in the call log indicates whether the call succeeded or failed.

Within the scope of the illustrative embodiments, a call log can include any number of log files or other suitable data structures, each storing any number of log entries in a manner suitable for that data structure. A database table, an index file, a comma separated value file, a spreadsheet, and a text file are some non-limiting examples of a call log contemplated within the scope of the illustrative embodiments. Furthermore, as some non-limiting examples, the call log of an illustrative embodiment can include separate log files for inbound and outbound calls, or one file for inbound and outbound calls using one service provider and different files for different service providers, or one file for all inbound and outbound calls using all service providers available on the device, or some combination thereof.

The illustrative embodiments recognize that presently available methods for controlling or avoiding undesirable calls suffer from several disadvantages. For example, the blacklist is often published by an entity, such as a blacklist application ("app") vendor, and the user can often not modify the list. As another example, even when a user can modify the list, the modifications are limited to the format adopted by the list, e.g., just adding a phone number, or adding a phone number and an action to perform when a call is received from that number.

As another example, a blacklist only monitors or filters inbound calls. In some cases, a user may inadvertently, or due to perpetration of a fraud on the user, may call a phone number. Presently available blacklists are ineffective in preventing outbound calls to numbers associated with undesirable activities.

As another example, blacklists are often not sharable, or the sharing is controlled by the blacklist app vendor. For example, even if a user can add or delete numbers to or from his or her copy of a blacklist, the user generally cannot share that customized copy of the blacklist with selected users. The customized blacklist remains local to the user's device only and cannot even be applied to other devices the same user might use.

Even where sharing a customized blacklist is presently possible, the user can only share or provide the customized list to the blacklist app vendor, who can then distribute the customized blacklist to other users of the app. The user cannot control whom to share the user's blacklist with, and in what manner. For example, the user cannot set a duration for the share, a condition for the share, a group of users with whom to share, a groups of users with whom not to share, and so on.

Regardless of whether or not a user's blacklist is sharable, the blacklist is severely limited in the amount of information the blacklist can communicate. For example, the illustrative embodiments recognize that presently, a user cannot describe why a number on the blacklist is blacklisted. Similarly, a user cannot annotate the blacklisted number with additional information, such as y noting certain representations that the caller from that number makes, the nature of transactions they propose, the user's personal experience with the caller or the call from that number, and other similar information.

The illustrative embodiments recognize that without the annotation of reasons, descriptions, experiences associated with a blacklisted number, another user who receives a call from the number or makes a call to the number has to simply trust someone else's judgment in placing that number on the blacklist. The other user cannot decide for himself or herself whether the specific reason for blacklisting that number applies to the other user. Additionally, the other user cannot determine a nature of harm or fraud possible by accepting a call from that number or making a call to that number.

There are websites where users can comment about undesirable calls to and from certain phone numbers. However, the illustrative embodiments recognize that to use such websites, a user has to make the overt actions of reaching that website, finding the information, and making the determination of whether to accept the call. Due to the amount of time and effort required in using such websites and information sources, using them while an inbound call is ringing poses the risk of missing the call if the user eventually decides to accept the call. Accordingly, such websites and similar information sources are useful only in a post-facto manner, after the user has already suffered the annoyance or harm from an undesirable call.

The illustrative embodiments used to describe the invention generally address and solve the above-described problems and other problems related to controlling or managing undesirable phone calls. The illustrative embodiments provide a method, system, and computer program product for call flagging using shared call logs.

The various embodiments execute in an application in a device that is used for initiating or receiving calls. An embodiment detects that the user has decided to identify or flag a call as an undesirable call. The embodiment locates a record or entry of the call (call entry) in a call log. The embodiment modifies, or allows the user to modify, the call entry with one or more annotations. For example, the user can provide information to the embodiment and the embodiment causes the call entry to be modified in the call log.

For example, the embodiment modifies the call entry by adding a user's reason for flagging the call and the number associated therewith as undesirable. As another embodiment, the embodiment modifies the call entry by adding a comment about user's experience with the call and the number associated therewith.

As another example, the embodiment modifies the call entry by adding a user's cautionary note with the call entry. For example, the note may describe a transaction that is proposed in the call, a series of events that occur during the call, and other such cautions, why other users should treat the call and the number associated therewith as undesirable.

The above examples of modifying the call entry in a call log are not intended to be limiting. From this disclosure, those of ordinary skill in the art will be able to conceive many other types of information with which to modify a call entry, and the same are contemplated within the scope of the illustrative embodiments.

An embodiment further selects a sharing rule. A rule comprises logic implemented or described in any suitable form. A sharing rule comprises logic for determining one or more parameters of sharing the modified call entry.

For example, one example sharing rule identifies a subset of a user's set of contacts on a social network or social media (social contacts), with whom the user's modified call entry can be shared. The subset of the set of social contacts may be chosen in any suitable manner, including but not limited to selecting the subset according to a criterion, or by using a user-provided selection. In one embodiment, the social contacts comprise other users, other profiles or devices of the user, or a combination thereof.

Another example sharing rule identifies a different subset of a user's social contacts, with whom the user's modified call entry should not be shared. Another example sharing rule identifies a period of time during which the user's modified call entry should be shared with a subset of a user's social contacts.

Some sharing rules can be configured to share different modified call entries with different social contacts of the user. For example, another example sharing rule identifies a subset of a set of user's modified call entries, which are sharable a user's social contact.

Some sharing rules can be configured to share different versions of a modified call entry, or different portions of a modified call entry, with different social contacts of the user. For example, another example sharing rule identifies one portion of a user's modified call entry to share with one social contact of the user and another portion of the same user's modified call entry to share with another social contact of the user.

The embodiment applies the selected sharing rule to one or more modified call entries in a user's call log. Thus, the embodiment makes one or more modified call entries available to selected social contacts of a user. The above examples of sharing rules are not intended to be limiting. From this disclosure, those of ordinary skill in the art will be able to conceive many other rules for sharing modified call entries among the social contacts of a user, and the same are contemplated within the scope of the illustrative embodiments.

At any given time, a set of modified call entries configured to manage undesirable calls is available to a user. The set of modified call entries comprises call entries modified by the user, call entries modified and shared with the user by a social contact of the user, or a combination thereof. Furthermore, a set of modified call entries is usable in conjunction with a prior-art blacklist.

Another embodiment detects an inbound call to the device or an outbound call from the device. The embodiment uses the set of modified entries to determine whether the call is undesirable. In one embodiment, the modified call entries that another user shares with the user of the device are accessible over the social network on demand. In other words, a shared modified call entry is not downloaded to the device, but is accessible from the device as and when needed to evaluate a call.

In one example operation, when the inbound call rings, or when the outbound call is initiated (collectively referred to as "present call"), the embodiment accesses a data network to reach a social networking site to locate modified call entries that one or more of the user's social contacts have shared with the user. The embodiment evaluates the present call using one or more modified call entries that the embodiment may find shared at the time of the present call.

In some cases, the user may begin a conversation on the present call before an embodiment can complete evaluating the present call and determine whether the present call is undesirable. In such cases, the embodiment notifies the user about the undesirable nature of the present call during the conversation of the present call. One example embodiment provides an audible, visible, or haptic feedback, or some combination thereof, on the device to the user, prompting the user to observe that the present call is undesirable.

In some cases, a caller id masquerades the phone number as belonging to an entity or person other than the entity or person using the number. For example, the caller id of a fraudulent call may masquerade the call as coming from a legitimate bank or a family member. In such cases, verification of the facts is an important part of determining whether the call is undesirable.

Accordingly, one embodiment identifies an aspect of a call as a stated fact, and performs fact checking or verification of that stated fact. In one example, the embodiment accesses a facts source, e.g., a website of the legitimate bank, to verify whether the number truly belongs to the bank. In another example, the embodiment accesses a facts repository, e.g., a yellow pages database, a white pages database, a real-property record, a public database, a business ranking or rating site, and the like, to verify whether the number truly belongs to the entity or the person identified in the caller id.

The number from which the call originates, the number to which the call is placed, the name of the caller or the called party, the caller id, are some aspects of the call that an embodiment can fact check in this manner. Many other aspects can similarly be fact-checked by an embodiment.

For example, during a present call, if the caller states that he or she is calling from or representing an entity, an embodiment can fact-check the existence of that entity by accessing a resource, such as a business registry database, over a data network. As another example, if the caller states that a particular commodity or security is going to be affected by a particular event, an embodiment can fact-check the existence of that commodity or security, that event, a relationship between the event and the commodity or security, potential alerts or warnings about the commodity or security or the event. Again, the embodiment can perform such fact-checking by accessing a resource, such as a securities database, a news database, and the like, over a data network.

If the stated fact is verified, the embodiment allows the present call to proceed. If the embodiment cannot verify the stated fact, or if the stated fact turns out to be false, the embodiment flags the present call as undesirable. The embodiment then notifies the user in any manner described in this disclosure about the undesirable nature of the present call.

The above examples of stated facts and fact-checking methods are not intended to be limiting. From this disclosure, those of ordinary skill in the art will be able to conceive many other stated facts and fact-checking methods to use with an embodiment, and the same are contemplated within the scope of the illustrative embodiments.

A method of an embodiment described herein, when implemented to execute on a device or data processing system, comprises substantial advancement of the functionality of that device or data processing system in managing undesirable calls on and from that device or data processing system. For example, the illustrative embodiments enable the device or data processing system, e.g., a mobile device, to detect an undesirable inbound or outbound call, share detailed annotated call log entries from the device or data processing system to a social network, and fact-check assertions made or implied by one or more aspects of the call. Such manner of managing undesirable calls is unavailable in presently available devices or data processing systems. Thus, a substantial advancement of such devices or data processing systems by executing a method of an embodiment comprises call flagging using shared call logs, thereby improving the management or avoidance of undesirable calls by using such improved data processing systems or devices.

The illustrative embodiments are described with respect to certain calls, aspects of a call, annotations, modification of call entries, call logs, social media or social networks, sharing rules, stated facts, facts sources or repositories, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
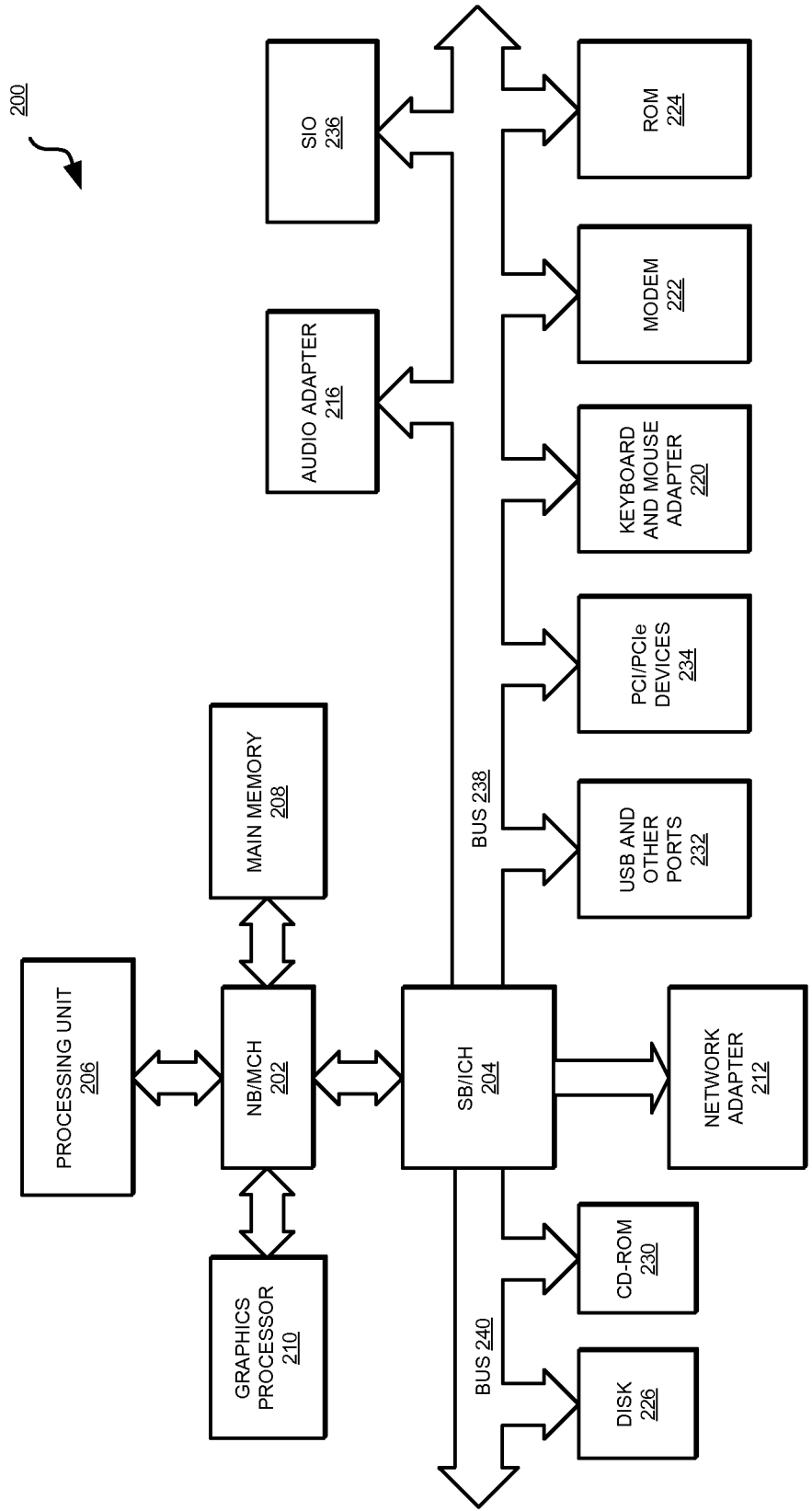
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 112 in a stationary or a portable form, a wearable computing device, or any other suitable device that can be configured for initiating or receiving a call, such as by using telephony subsystem 136, and processing call entries in call log 138, as described herein. As an example, telephony subsystem 136 may be a combination of hardware and software to make calls over a phone service provider's network. Application 134 implements an embodiment, and operates in conjunction with telephony subsystem 136 and call log 138, as described herein. Client 112 may be another device or data processing system used by a social contact of the user of device 132. For example, client 112 may be configured with telephony subsystem 112A, e.g., a Voice over Internet Protocol (VoIP) application to make calls over a data network. Application 113 implements an embodiment described herein, and operates in conjunction with telephony subsystem 112A and call log 112B as described herein. Fact source 105 may be a source of factual information external to device 132, from which application 134 may collect information to verify a stated fact. As a non-limiting example, fact source 105 may be a web server. Similarly, facts 109 may be any type or number of factual information, stored in any type or number of repositories using any type or number of storage 108 external to device 132. Social networking site or social media site 107 may comprise a social media server using which application 134 or 113 can share modified call entries, search shared modified call entries on demand, or a combination thereof.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 or application 113 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
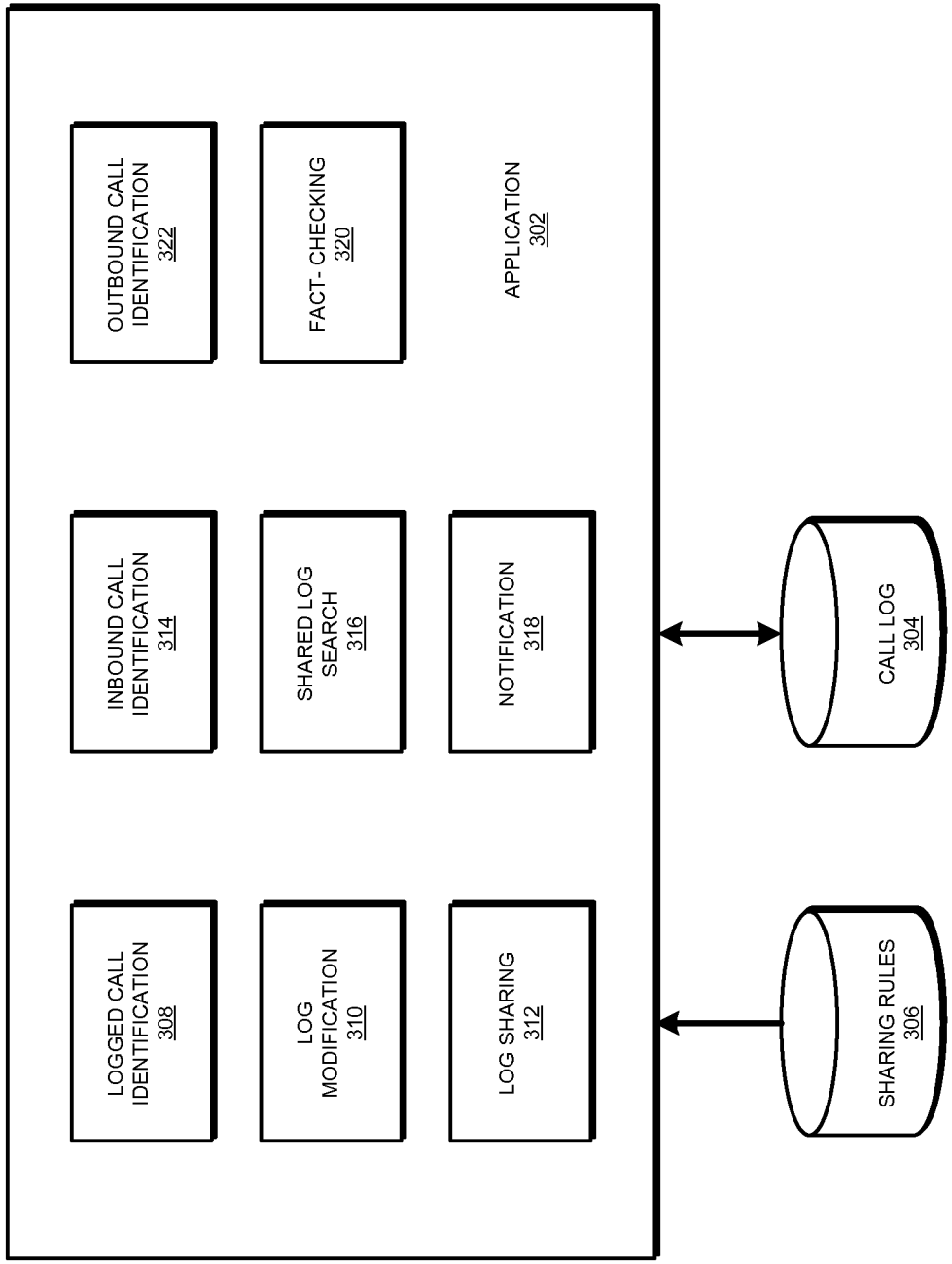
FIG. 3 depicts a block diagram of an example application for call flagging using shared call logs in accordance with an illustrative embodiment.

With reference to FIG. 3, this figure depicts a block diagram of an example application for call flagging using shared call logs in accordance with an illustrative embodiment. Application 302 is an example of application 113 or 134 in FIG. 1. Correspondingly, call log 304 is an example of call log 112B or 138 in FIG. 1. Sharing rules 306 can be stored in a device, e.g., in device 132 or data processing system 112, or be accessible from the device, e.g., from device 132 or data processing system 112 over network 102 in FIG. 1.

Component 308 identifies a call that is logged in call log 304. A present call can be a logged call in that at least some information of the present call is available in call log 304 while the present call is in progress, such as in an incomplete call entry. A past completed call can be a logged call in that the call entry of the past call is complete in call log 304. Component 308 enables the user to identify a call whose call entry the user wishes to modify in call log 304.

Component 310 enables the user to modify a call entry to form a modified call entry in call log 304. For example, component 310 provides an interface, using which the user can input a comment, an annotation, or other descriptive text or data to flag a call and the associated number as an undesirable call.

Component 312 uses one or more sharing rules from sharing rules 306 to share all or part of a modified call entry. For example, component 312 accesses a social networking site, e.g., site 107 in FIG. 1, to identify a set of social contacts of the user. Component 312 additionally identifies a subset of the set of social contacts according to a sharing rule. Component 312 additionally identifies one or more parts of one or more modified call entries in call log 304. Component 312 makes those one or more parts of one or more modified call entries from call log available to the subset of the user's social contacts via the social networking site.

Component 314 detects an inbound call at the device where application 302 is executing. Component 314 identifies one or more aspects or attributes of the call, e.g., a name of the calling entity or person, a number from which the call appears to originate, or another attribute available in the caller id.

Component 316 uses one or more of the identified aspects or attributes to perform a search of the shared modified call entries. For example, component 316 accesses a social networking site, e.g., site 107 in FIG. 1, to identify a set of social contacts of the user. Component 312 identifies those social contacts of the user who are sharing one or more parts of one or more modified call entries. Component 316 evaluates the inbound call using the shared modified call entries or parts thereof, to determine whether the inbound call is undesirable. Note that component 316 can also use the user's own modified call entries, such as from call log 304, for such evaluation.

If the inbound call is undesirable, component 318 notifies the user about the undesirable nature of the inbound call. Component 318 draws the attention of the user to the notification visually, audibly, haptically, or by using some combination thereof.

In addition, component 318 presents the comments, reasons, annotations, and other information from the applicable modified call entries used in determining that the call is undesirable. For example, component 318 displays one or more comments from another user who previously received a call from the same caller, where the comments describe the user's experience with the caller. As another example, component 318 displays one or more messages from another user who has researched one or more calls from the same caller, where the messages describe the user's findings about the details of the fraud being perpetrated by the caller.

As another example, component 318 displays one or more suggestions from another user who is a social contact and recommends to the user that the call is likely to cause a disruption, problem, or trouble for the user in particular. For example, if the user is trying to be rid of a habit and the call leads to an entity or subject that promotes that habit, a friend of the user may suggest via a modified call entry that the user not participate in the call.

Component 320 performs fact-checking or verification of facts. Component 320 identifies a stated fact in a call, e.g., from the caller id of the call, or from an assertion in a content portion of the call. Component 320 accesses one or more facts sources, facts repositories, or a combination thereof, and verifies the stated fact by comparing the stated fact with comparable attributes of the facts available from such sources or repositories. When a stated fact cannot be verified as accurate or correct, component 320 flags the call and notifies the user using component 318.

Component 322 operates on outbound calls from the device where application 302 is executing. Components 316, 318, and 320 have been described above with respect to their operations on inbound calls. Component 322 causes components 316, 318, and 320 to operate in a similar manner on outbound calls from the device. For example, when component 322 detects an outbound call, component 316 performs the search and evaluation operations described elsewhere using one or more attributes of the outbound call. Similarly, component 320 performs the notification functions, and component 322 performs the fact-checking operations, with respect to the outbound call.

With reference to FIG. 4, this figure depicts a flowchart of an example process for creating a sharable modified call entry in a call log in accordance with an illustrative embodiment. Process 400 can be implemented in application 302 in FIG. 3.

The application determines that a call should be flagged as undesirable, such as by identifying a call entry in a call log (block 404). The application selects the call entry from the call log for modification (block 406).

The application modifies the call entry, such as to specify a reason, a comment, or an annotation for flagging the call (block 408). The application can repeat block 408 to modify the call entry with any number of such comments, reasons, or annotations. For example, according to one embodiment, the application allows multiple comments to be associated with a call entry such that different comments are shared with different social contacts. According to another example embodiment, the application determines that multiple call entries exist in the call log for calls to or from the same number. The application allows different annotations to be associated with different call entries, and all or some of the modified call entries relating to the call number may then be shared in various ways described in this disclosure.

The application selects a sharing rule (block 410). The application shares all or part of one or more modified call entries on a social network according to the selected sharing rule (block 412). The application ends process 400 thereafter.

With reference to FIG. 5, this figure depicts a flowchart of an example process for call flagging using shared call logs in accordance with an illustrative embodiment. Process 500 can be implemented in application 302 in FIG. 3.

The application either detects receiving an inbound call at the device where the application is executing (block 502), or detects an outbound call from the device (block 503). The application accesses a collection of modified call entries shared on a social networking site by one or more social contacts of the user of the device (block 504). The application may also access the user's own modified call entries in block 506.

The application determines if the call of blocks 502 or 503 is flagged as undesirable by any of the shared modified call entries (block 506). If the call is not flagged ("No" path of block 506), the application allows the call to proceed normally (block 508). The application ends process 500 thereafter.

If the call is flagged as undesirable in one or more modified call entries ("Yes" path of block 506), the application determines whether the call is in progress or still waiting to be connected (block 510). Another process, such as process 600 in FIG. 6, can also enter process 500 at entry point "A" and begin executing process 500 onwards from block 510.

If the call is not yet in progress, e.g., the device is still ringing on the inbound call or the called number is still ringing on the outbound call ("No" path of block 510), the application notifies the user with the flagging reasons in any manner described herein or other similarly purposed manners of notification (block 512). The application ends process 500 thereafter.

If the call is in progress, e.g., a conversation is ongoing in the call ("Yes" path of block 510), the application attracts the user's attention to the notification about the reasons for flagging the call (block 514). For example, the application interrupts the call to provide the notification, overlays the notification message on the call, or provides in-call notification by visible, audible, or haptic feedback. The interruption, the overlays, or the feedbacks are perceptible to the user of the device, and may or may not be perceptible to the other party in the call. The application ends process 500 thereafter.

With reference to FIG. 6, this figure depicts a flowchart of an example process for verifying a stated fact of a call in accordance with an illustrative embodiment. Process 600 can be implemented in application 302 in FIG. 3.

In an inbound or an outbound call, the application identifies an attribute of the call as a stated fact (block 604). The application accesses a facts source, a facts repository, or a combination thereof to verify the stated fact (block 606).

The application determines whether the stated fact has been verified successfully (block 608). If the stated fact is verified ("Yes" path of block 608), the application allows the call to proceed normally (block 610). The application ends process 600 thereafter.

If the stated fact is not verified, e.g., when the stated fact cannot be substantiated or turns out to be false, ("No" path of block 608), the application flags the call as undesirable, adding a reason for the flagging to the call entry in the call log (block 512). For example, the application modifies the call entry of the call to specify that the call includes an unverified stated fact. Thereafter, the application causes process 600 to ext at exit point marked "A" to enter process 500 at corresponding entry point marked "A" in process 500.

Thus, a computer implemented method, system or apparatus, and computer program product are provided in the illustrative embodiments for call flagging using shared call logs. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for call flagging using shared call log entries, the method comprising:
   determining, using a processor in a device, that a phone call should be flagged as undesirable;
   selecting, in a call log in the device, a call entry corresponding to the phone call;
   modifying the call entry to form a modified call entry, the modified call entry comprising a first portion including a phone number associated with the phone call,
   a second portion including an annotation, the annotation describing a reason for flagging the call as undesirable, and
   a third portion including, a comment from a user of the device added as the user's experience with the phone call and the phone number associated therewith, the comment specifically for use by a specific social contact of a set of social contacts of the user of the device;
   configuring a sharing rule relative to the modified call entry; and
   sharing selectively, according to the sharing rule, the modified call entry with a subset of the set of social contacts of the user of the device on a social network, the sharing rule identifying which of the first portion, the second portion, and the third portion is shareable with one or more of the subset of the set of social contacts of the user.

2. The method of claim 1, further comprising:
   detecting, at the device, that the device is participating in a second phone call;
   searching, from the device, the set of social contacts to identify a set of shared modified call entries, a first subset of the set of shared modified call entries being shared by a first social contact in the set of social contacts and a second subset of the set of shared modified call entries being shared by a second social contact in the set of social contacts.

3. The method of claim 2, further comprising:
applying, to an attribute of the second call, a shared modified call entry from the set of shared modified call entries, the applying determining whether the second call is undesirable; and
notifying, using a notification on the device, while the device is participating in the second call, the user that the second call is undesirable.

4. The method of claim 3, further comprising:
determining that the second call is in progress; providing, using the device, a feedback to the user, the feedback causing the user to perceive the notification.

5. The method of claim 2, wherein a shared call entry in the first subset comprises a portion of a first modified call entry in a first call log associated with the first social contact.

6. The method of claim 2, wherein the second phone call is initiated from the device.

7. The method of claim 1, further comprising:
selecting an attribute of the phone call;
accessing a source of factual data;
comparing a value of the attribute with a value of a factual data from the source;
concluding, responsive to the comparing, that the value of the attribute cannot be verified, wherein the flagging of the phone call as undesirable is responsive to the concluding.

8. The method of claim 7, wherein the value of the attribute cannot be verified because the value of the attribute is incorrect.

9. The method of claim 7, wherein the attribute is extracted from a content portion of data of the phone call.

10. The method of claim 7, wherein the attribute is extracted from a caller identification portion of data of the phone call.

11. The method of claim 1, wherein the call log comprises a record of calls one of initiated from and received at the device.

12. The method of claim 1, wherein the method is embodied in a computer program product comprising one or more computer-readable tangible storage devices and computer-readable program instructions which are stored on the one or more computer-readable tangible storage devices and executed by one or more processors.

13. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

14. A computer program product for call flagging using shared call log entries, the computer program product comprising:
one or more computer-readable tangible storage devices;
program instructions, stored on at least one of the one or more storage devices, to determine, using a processor in a device, that a phone call should be flagged as undesirable;
program instructions, stored on at least one of the one or more storage devices, to select, in a call log in the device, a call entry corresponding to the phone call;
program instructions, stored on at least one of the one or more storage devices, to modify the call entry to form a modified call entry, the modified call entry comprising a first portion including a phone number associated with the phone call,
a second portion including an annotation, the annotation describing a reason for flagging the call as undesirable, and
a third portion including, a comment from a user of the device added as the user's experience with the phone call and the phone number associated therewith, the comment specifically for use by a specific social contact of a set of social contacts of the user of the device;
program instructions, stored on at least one of the one or more storage devices, to configure a sharing rule relative to the modified call entry; and
program instructions, stored on at least one of the one or more storage devices, to share selectively, according to the sharing rule, the modified call entry with a subset of the set of social contacts of the user of the device on a social network, the sharing rule identifying which of the first portion, the second portion, and the third portion is shareable with one or more of the subset of the set of social contacts of the user.

15. The computer program product of claim 14, further comprising:
program instructions, stored on at least one of the one or more storage devices, to detect, at the device, that the device is participating in a second phone call;
program instructions, stored on at least one of the one or more storage devices, to search, from the device, the set of social contacts to identify a set of shared modified call entries, a first subset of the set of shared modified call entries being shared by a first social contact in the set of social contacts and a second subset of the set of shared modified call entries being shared by a second social contact in the set of social contacts.

16. The computer program product of claim 15, further comprising:
program instructions, stored on at least one of the one or more storage devices, to apply, to an attribute of the second call, a shared modified call entry from the set of shared modified call entries, the applying determining whether the second call is undesirable; and
program instructions, stored on at least one of the one or more storage devices, to notify, using a notification on the device, while the device is participating in the second call, the user that the second call is undesirable.

17. The computer program product of claim 16, further comprising:
program instructions, stored on at least one of the one or more storage devices, to determine that the second call is in progress; providing, using the device, a feedback to the user, the feedback causing the user to perceive the notification.

18. The computer program product of claim 15, wherein a shared call entry in the first subset comprises a portion of a first modified call entry in a first call log associated with the first social contact.

19. A computer system for call flagging using shared call log entries, the computer system comprising:
one or more processors, one or more computer-readable memories and one or more computer-readable storage devices;
program instructions, stored on at least one of the one or more storage devices, to determine, using a processor in a device, that a phone call should be flagged as undesirable;
program instructions, stored on at least one of the one or more storage devices, to select, in a call log in the device, a call entry corresponding to the phone call;

program instructions, stored on at least one of the one or more storage devices, to modify the call entry to form a modified call entry, the modified call entry comprising a first portion including a phone number associated with the phone call, a second portion including an annotation, the annotation describing a reason for flagging the call as undesirable, and a third portion including, a comment from a user of the device added as the user's experience with the phone call and the phone number associated therewith, the comment specifically for use by a specific social contact of a set of social contacts of the user of the device;

program instructions, stored on at least one of the one or more storage devices, to configure a sharing rule relative to the modified call entry; and program instructions, stored on at least one of the one or more storage devices, to share selectively, according to the sharing rule, the modified call entry with a subset of the set of social contacts of the user of the device on a social network, the sharing rule identifying which of the first portion, the second portion, and the third portion is shareable with one or more of the subset of the set of social contacts of the user.

* * * * *